United States Patent
Lovascio et al.

(10) Patent No.: US 10,458,679 B2
(45) Date of Patent: Oct. 29, 2019

(54) PLATE HEAT EXCHANGER, IN PARTICULAR FOR CONDENSING BOILERS

(71) Applicant: GAS POINT S.r.l., Brescello (IT)

(72) Inventors: Nicola Lovascio, Sant'ilario d'Enza (IT); Raffaello Rastelli, Sorbolo (IT); Claudio Zatti, Sorbolo (IT)

(73) Assignee: GAS POINT S.R.L., Brescello (IT)

( * ) Notice: Subject to any disclaimer, the term of this patent is extended or adjusted under 35 U.S.C. 154(b) by 83 days.

(21) Appl. No.: 15/038,335

(22) PCT Filed: Nov. 20, 2014

(86) PCT No.: PCT/IB2014/066208
§ 371 (c)(1),
(2) Date: May 20, 2016

(87) PCT Pub. No.: WO2015/075672
PCT Pub. Date: May 28, 2015

(65) Prior Publication Data
US 2016/0298874 A1 Oct. 13, 2016

(30) Foreign Application Priority Data

Nov. 20, 2013 (IT) .............................. BO2013A0632

(51) Int. Cl.
*F24H 8/00* (2006.01)
*F28F 9/02* (2006.01)
(Continued)

(52) U.S. Cl.
CPC ................. *F24H 8/00* (2013.01); *F24H 1/38* (2013.01); *F28D 9/0056* (2013.01); *F28F 3/046* (2013.01);
(Continued)

(58) Field of Classification Search
CPC ........ F24H 8/00; F28D 9/0006; F28D 9/0056; F28D 9/0031; F28D 9/0037;
(Continued)

(56) References Cited

U.S. PATENT DOCUMENTS 3,334,399 A * 8/1967 Teeguarden ........... B21D 53/04
165/166
5,109,806 A * 5/1992 Duggan .................... F24H 1/32
122/135.2
(Continued)

FOREIGN PATENT DOCUMENTS

BE 764949 8/1971
DE 3020557 12/1981
(Continued)

OTHER PUBLICATIONS

International Search Report and Written Opinion of the International Search Authority dated Apr. 17, 2015, for International Application PCT/IB2014/066208, filed Nov. 20, 2014, Applicant, Gas Point S.r.l. (10 pages).

*Primary Examiner* — Eric S Ruppert
(74) *Attorney, Agent, or Firm* — McCracken & Gillen LLC

(57) ABSTRACT

A heat exchanger for boilers, in particular for condensing boilers. The heat exchanger having a set of heat exchanging plates inside which the water to be heated flows and outside which the combustion products coming from a burner pass. The heat exchanger has plates coupled to diaphragms for closing openings present on the plates; each plate having at least two levels of respective channels for the water flow to be heated. Hydraulic connections in series between the channels can be provided on the layer closest to a burner.

12 Claims, 13 Drawing Sheets

(51) Int. Cl.
    *F28D 9/00* (2006.01)
    *F24H 1/38* (2006.01)
    *F28F 3/04* (2006.01)
    *F28F 3/08* (2006.01)
    *F28F 13/06* (2006.01)
    *F28D 21/00* (2006.01)
(52) U.S. Cl.
    CPC ............ *F28F 3/086* (2013.01); *F28F 9/0221* (2013.01); *F28F 13/06* (2013.01); *F28D 2021/0024* (2013.01); *F28F 2255/08* (2013.01); *Y02B 30/102* (2013.01)
(58) Field of Classification Search
    CPC .... F28D 9/0043; F28D 9/0081; F28D 9/0093; F28D 9/02; F28F 3/046; F28F 3/086; F28F 9/0021; F28F 13/06
    USPC .......... 165/167; 122/31.1, 33, 31.2, 32, 18.1
    See application file for complete search history.

(56) References Cited

U.S. PATENT DOCUMENTS

| | | | | |
|---|---|---|---|---|
| 5,470,431 A | * | 11/1995 | Okuda | F25B 39/022 159/27.1 |
| 5,855,240 A | * | 1/1999 | Farrell | F28D 1/0341 165/152 |
| 2003/0066633 A1 | * | 4/2003 | Lee | F25B 39/02 165/144 |
| 2004/0159424 A1 | * | 8/2004 | Reinke | F28D 9/005 165/140 |
| 2004/0244955 A1 | * | 12/2004 | Laveran | F28D 1/0391 165/150 |
| 2005/0056412 A1 | * | 3/2005 | Reinke | F28D 9/005 165/167 |
| 2006/0278377 A1 | * | 12/2006 | Martins | F02B 29/0412 165/140 |
| 2007/0125527 A1 | * | 6/2007 | Flik | F02B 29/0412 165/140 |
| 2012/0088200 A1 | * | 4/2012 | Haydock | F27D 17/004 431/202 |
| 2012/0216562 A1 | * | 8/2012 | Kadle | B60H 1/00899 62/434 |
| 2012/0222848 A1 | * | 9/2012 | Sicks | F28F 9/0204 165/173 |
| 2013/0014740 A1 | | 1/2013 | Tolleneer et al. | |
| 2013/0092360 A1 | * | 4/2013 | Day | F28D 9/0043 165/166 |
| 2013/0240186 A1 | * | 9/2013 | Taras | F28D 1/05391 165/146 |
| 2014/0158328 A1 | * | 6/2014 | Persson | F28F 3/042 165/109.1 |

FOREIGN PATENT DOCUMENTS

| | | |
|---|---|---|
| DE | 10043283 | 3/2002 |
| DE | 102005033050 | 3/2006 |
| WO | WO 2003-106909 | 12/2003 |
| WO | WO 2008-107760 | 9/2008 |

* cited by examiner

PLATE HEAT EXCHANGER, IN PARTICULAR FOR CONDENSING BOILERS

TECHNICAL FIELD

The present invention concerns an innovative plate heat exchanger.

In particular, the present invention finds an advantageous, but not exclusive, application in the field of condensing boilers, to which the following description will make explicit reference without thereby losing generality.

BACKGROUND ART

As it is well known, several types of heat exchangers for condensing boilers are available on the market.

They are characterized by different yield, shape, size, material, construction technique and manufacturing costs.

Among all the already existing exchangers, the so called "plate" heat exchangers are characterized by their high compactness, heat exchange efficiency and simple construction.

The document DE 100 43 283 A1 (BOSCH) illustrates a typical plate heat exchanger used for condensing boilers.

The inlet and outlet collectors of the fumes are opposite and are close to, respectively, outlet and inlet collectors of the water, thus leading to a very efficient heat exchange called counter-current.

The fumes inlet collector has been suitably sized to house the burner, thus forming with it the actual combustion chamber of the boiler.

The document BE 764949 A1 (Riello) illustrates a solution showing several similarities to the previous document.

Both solutions have some drawbacks.

In both cases, the larger holes formed in the plates are intended to form the inlet and outlet collectors of the fumes, the larger of the two being suitably sized to house the burner, thus becoming the combustion chamber of the boiler.

Therefore, in both cases, the manufacture of the heat exchanger produces a significant amount of scraps of the sheet metal forming the plates, with a consequent cost increase.

In both cases, water and fumes run along parallel channels. Therefore, with equal flow rates, the flow of water passing within each single water channel exclusively depends on the number of plates of the heat exchanger.

However, it is well known that, to prevent the water passing through the portion of ducts facing the combustion chamber from boiling is remarkably difficult.

The thermal load per unit area transferred to that portion of ducts by fumes at about 1000° C. is so high that water immediately boils.

To avoid this problem, the water must flow at a very high speed and in large amounts; this result can not be reached if the water is distributed in parallel in single channels. In order to limit, at least partially, the waste of sheet metal caused by the fumes collector, and to decrease the amount of peripheral welding in the plates, solutions have been found in which only the plates flown through by water are closed along their outer perimeter, while the fumes channels are open along their perimeter and the whole fumes circuit is externally delimited by a casing.

Documents WO-A2-03/106909 (WORGAS) and DE-A1-10 2005 033 050 (VAILLANT) illustrate solutions in which the fumes circuit is delimited by a containment vessel.

However, even these solutions present some drawbacks.

The solution illustrated in document WO-A2-03/106909 (WORGAS) is not economical, since the circular shape given to the plates implies a large waste of the sheet metal forming the plates.

Analogously, the solution illustrated in document DE-A1-10 2005 033 050 (VAILLANT) is not economical, since the C-shape given to the plates implies a large waste of the sheet metal forming the plates.

In order to limit, at least partially, the boiling problems caused by the insufficient speed and amount of the water flowing through the channels surrounding the combustion chamber, solutions have been developed in which the speed of the water circulating in that area has been increased.

The first step was the creation, in the elements flown through by water, of some fixed paths around the combustion chamber having a limited passage section, thereby causing a consequent increase in the water speed.

Documents DE-A1-10 2005 033 050 (VAILLANT) and WO-A2-2008/107760 (GAS POINT) illustrate these solutions.

However, this method clashes with the need not to have too small passage sections in order to prevent deposits of limestone (calcium carbonate and magnesium) resulting from the precipitation of limestone (calcium bicarbonate and magnesium), which is always present in more or less relevant amounts in the water of the heating system, from rapidly clogging the pipes.

DISCLOSURE OF INVENTION

The object of the present invention is therefore to provide a plate heat exchanger, in particular for condensing boilers, which is free from the aforesaid drawbacks and, at the same time, is easy and inexpensive to manufacture.

Therefore, according to the present invention, it is provided a plate heat exchanger, as claimed in the independent claim 1 or in any of the claims directly or indirectly dependent on claim 1.

BRIEF DESCRIPTION OF THE DRAWINGS

For a better understanding of the present invention some preferred embodiments will now be described, purely by way of non-limiting examples and with a reference to the accompanying drawings, wherein.

BEST MODE FOR CARRYING OUT THE INVENTION

Figure 1:
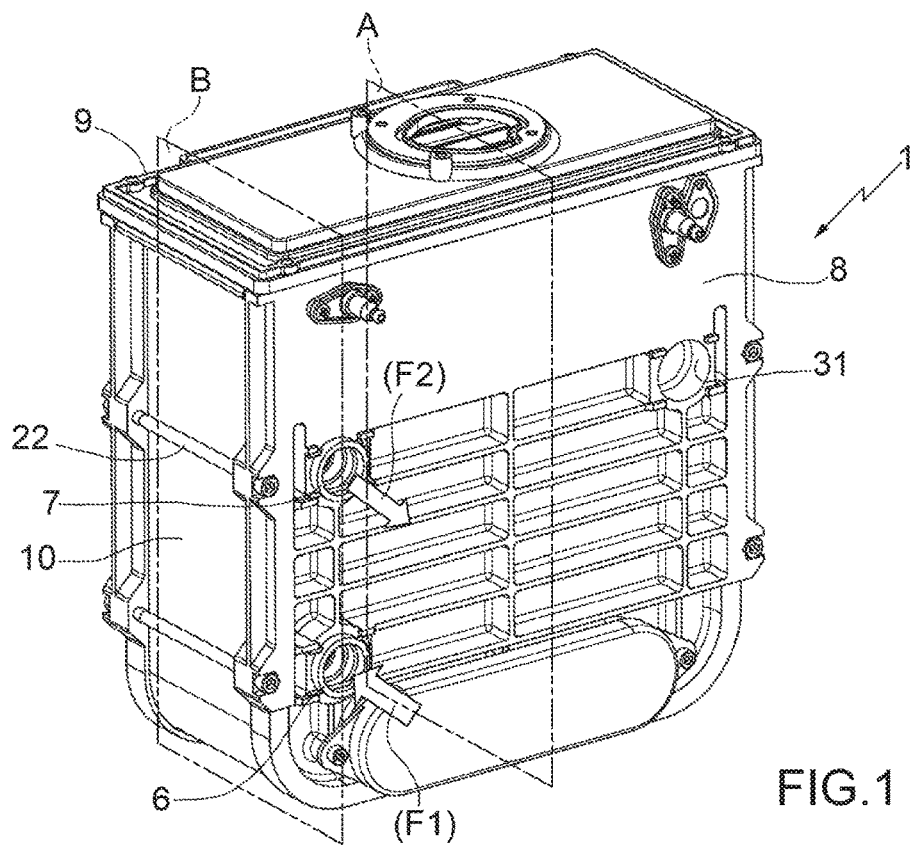
FIG. 1 shows a three-dimensional overall view of a plate heat exchanger according to the present invention.

In FIG. 1, 1 indicates in its entirety a plate heat exchanger which is the main object of the present invention.

Figure 4:
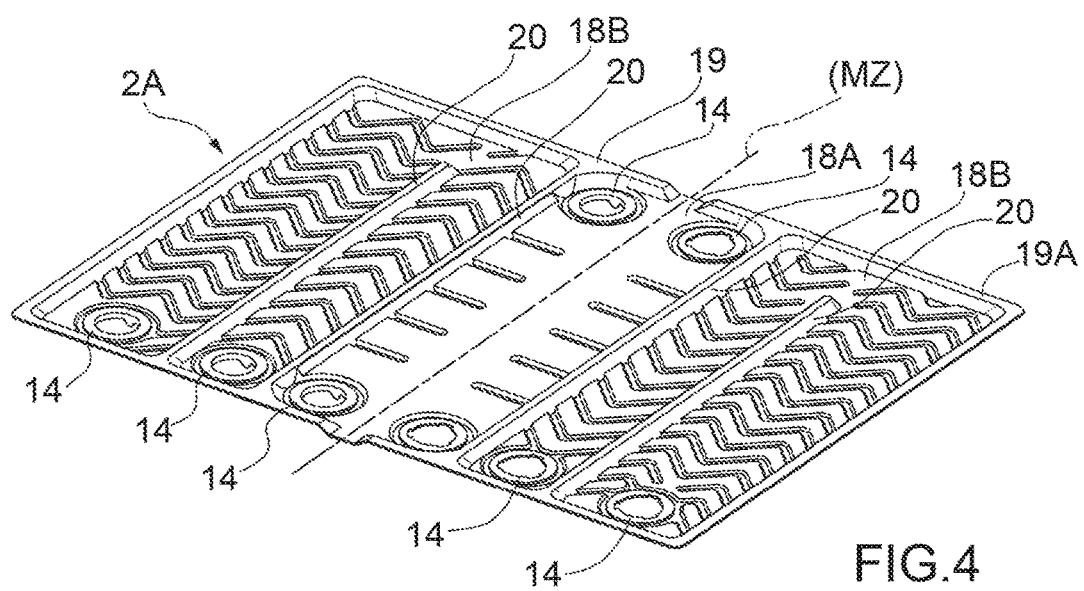
FIG. 4 shows a first face of a formed and sheared sheet metal suitable to provide the plate heat exchanger of FIGS. 1, 2, 3.
Figure 5:
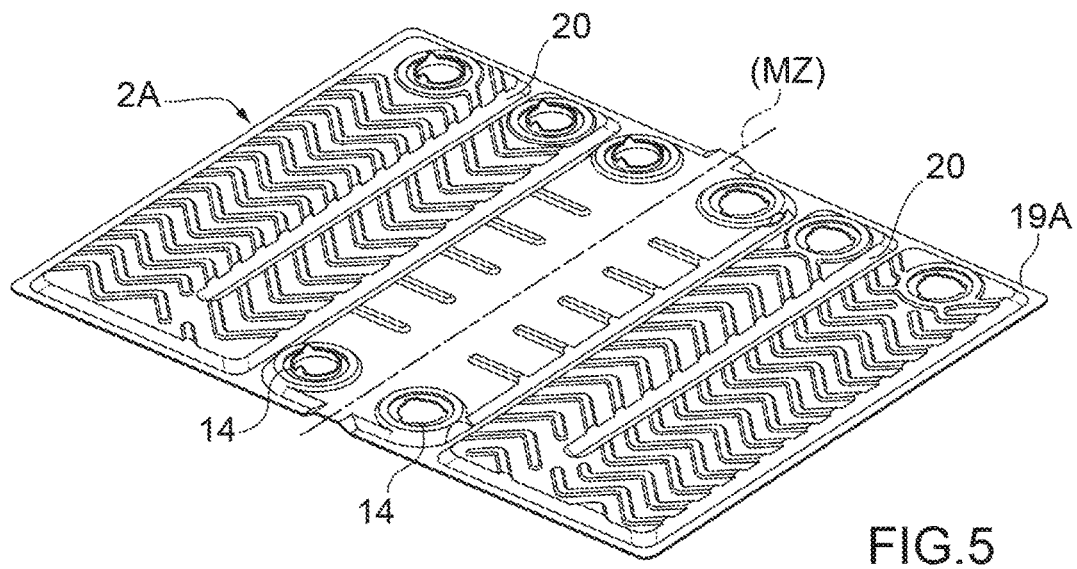
FIG. 5 shows a second face of the formed and sheared sheet metal of FIG. 4.

The neat exchanger 1 comprises a set of heat, exchanging elements, called plates 2, having a substantially rectangular shape. Each plate 2 is made by using a single sheet metal starting from a single folded sheet 2A (FIGS. 4 and 5).

In actual use, the fluid to be heated (for example, water, diathermic oil etc.) passes within each plate 2; the combustion products 3 (fumes), coming from a burner 4 present in a combustion chamber 4A, flow outside, and in particular in a plurality of gaps 40 formed between a plate 2 and the other.

Heat exchanger 1 is preferably intended to be used in a gas condensing boiler 100 (FIGS. 2, 3), where the heated fluid is water, the fuel is natural gas and the combustion products 3 are cooled to the condensation point of water-vapour and moisture contained in them.

Figure 2:
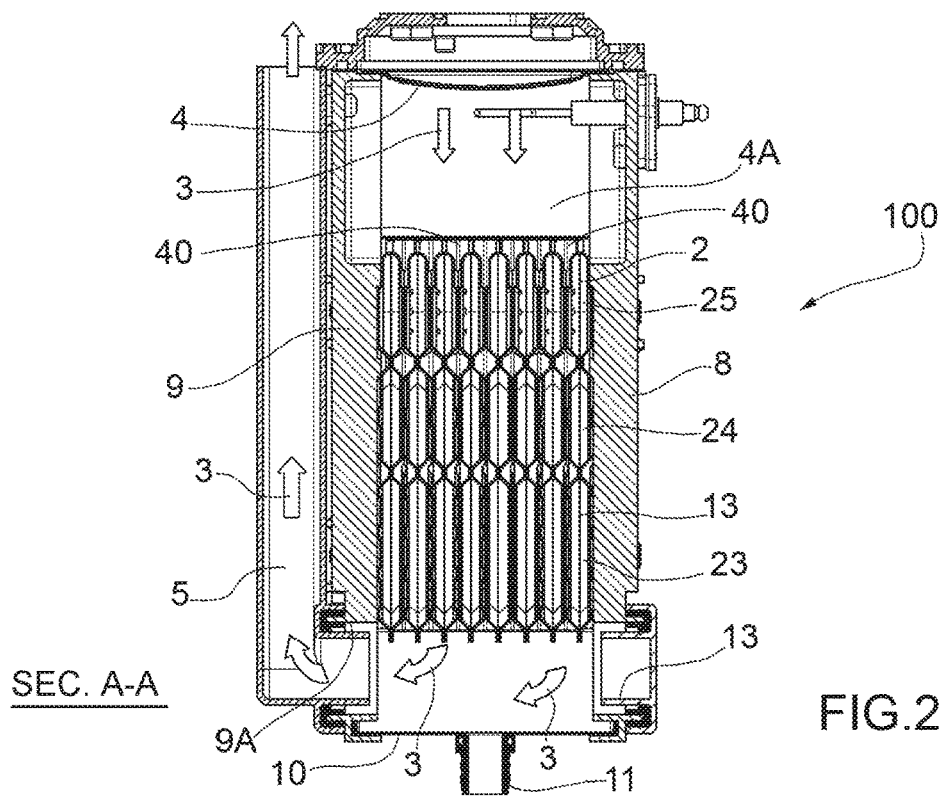
FIG. 2 shows a condensing boiler in which the heat exchanger of FIG. 1 has been cut along a plane A-A.
Figure 3:
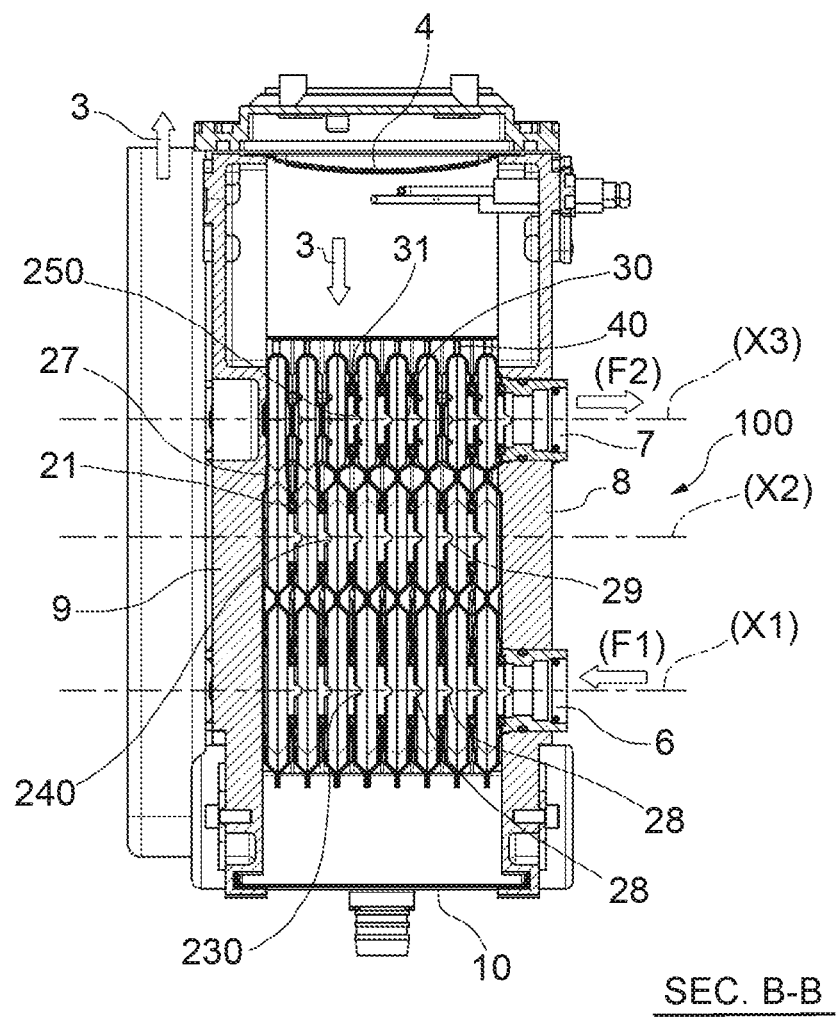
FIG. 3 shows the same condensing boiler of FIG. 1 wherein the heat exchanger of FIG. 1 has been cut along a plane B-B.

The typical (but not exclusive) arrangement of heat exchanger 1 is the one shown in FIGS. 2 and 3.

In this particular embodiment, burner 4 is placed at the top of boiler 100 and above heat exchanger 1. Flame of the burner 4 is facing downwards and, on a first stretch, the combustion products 3 flow vertically downwards in order to pass through gaps 40 that are located between plates 2 of heat exchanger 1.

Combustion products 3 are collected in the lower part, below heat exchanger 1, to be finally discharged through a vertical exhaust duct 5.

Obviously, the vertical flow of combustion products 3 through the exhaust duct 5 goes upwards.

The lower front part of the heat exchanger comprises a fitting 6 for its connection to the system return flow (FIG. 3; arrow (F1)), while the upper front part comprises a fitting 7 for its connection to the system supply flow (FIG. 3; arrow (F2)).

Therefore, hereinafter in the present description spatial references related to the exchanger 1 (upper, lower, vertical, horizontal, front, back) will refer to this arrangement; in spite of the fact that heat exchanger 1 can nave a different spatial arrangement.

Plates 2 are arranged inside a container comprising, for example, a pair of containment plates 8, 9 made of aluminium in contact with the outer walls of the two front and back plates 2 of heat exchanger 1, and a casing 10 for the collection of combustion products.

Moreover, casing 10 comprises an exhaust duct 11 for the produced condensate (FIG. 2).

As illustrated in FIG. 2, plate 9 is provided with a hole 9A connecting it to the exhaust duct 5 for combustion products 3.

The other plate 8 can be usefully provided with an access hole 13 to the casing 10, so that an operator can carry out its periodic maintenance and cleaning from the corrosion products which in time are inevitably produced and collected in its bottom.

Hereinafter the aspects characterizing the heat exchanger 1 will be described with a reference to the attached figures. As previously stated, the heat exchanger 1 essentially comprises a plurality of heat exchange plates 2.

Each plate 2 substantially consists of a shell of sheet metal having a suitable thickness, made (preferably but not necessarily) of stainless steel, inside which the water of the boiler circulates, while the combustion products 3 (FIGS. 2, 3) pass outside, in the gap 40 formed by the adjacent walls of two plates 2.

Each plate 2 is manufactured starting from a sheet metal 2A (FIG. 4) which is formed, then plastically deformed by drawing and sheared, thus obtaining two central zones 18A, 18B, lowered with respect to a horizontal reference plane 19 on which the outer edge is located.

Beside the central areas, namely the central area 18A and the side and lowered areas 18B, inner side strips 20 are provided on the same horizontal reference plane 19 (FIG. 4).

In the so obtained shaped sheet metal 2A, through holes 14 (obtained by shearing the sheet metal 2A) are then formed in the amount and positions necessary for the operation shown below.

Figure 6:
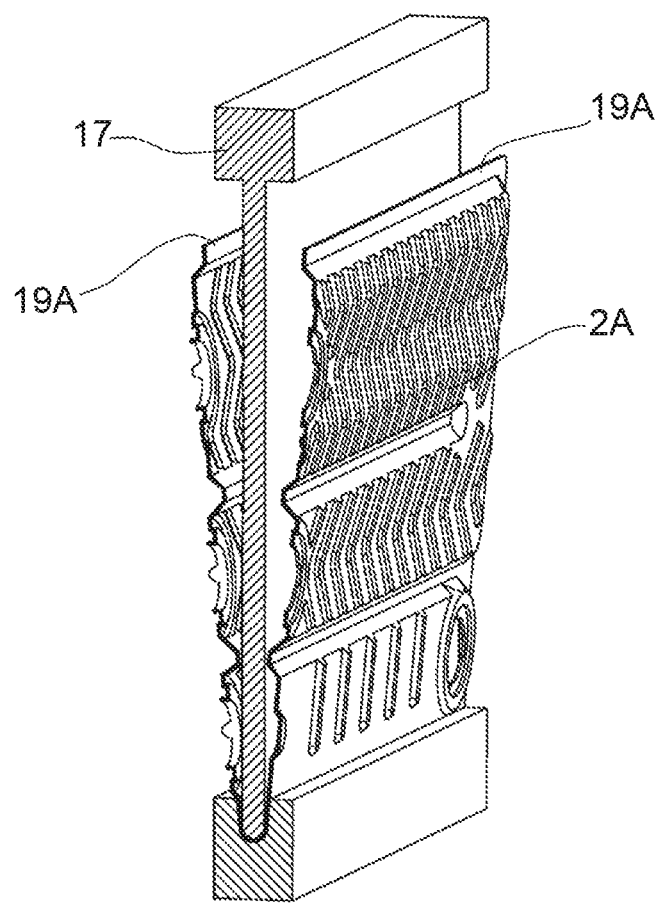
FIG. 6 shows the sheet folding operation illustrated in FIGS. 4 and 5 for manufacturing a plate of the heat exchanger.

The shaped and perforated metal sheet 2A is subjected to a bending operation along the middle line (MZ) (FIG. 4), as shown in FIG. 6.

The folding of metal sheet 2A along the middle line (MZ) is achieved by using a special folding tool 17 (FIG. 6).

The metal sheet 2A is folded with a suitable bending radius until obtaining an almost complete closure that allows, however, the bending tool 17 to be removed by extraction.

The metal sheet 2A folded along the middle line (MZ) is then completely closed by crushing the rectangular outer edge 19A so as to bring into contact the flaps of metal sheet of the three sides which are drawn near.

The thus obtained element is finally welded on the three sides 15 and in the inner areas lying on the same plane of the peripheral edge during the previous drawing step; all according to techniques of autogenous welding or brazing which are widely known in the art.

To manufacture the heat exchanger 1, plates 2 are assembled by interposing toroidal gaskets 21 (FIG. 3) in correspondence to through holes 14 for the passage of water.

Plates 2 are held in position by using tie rods 22 and containment plates 8, 9 of all plates 2 of heat exchanger 1 (FIG. 1).

Figure 7:
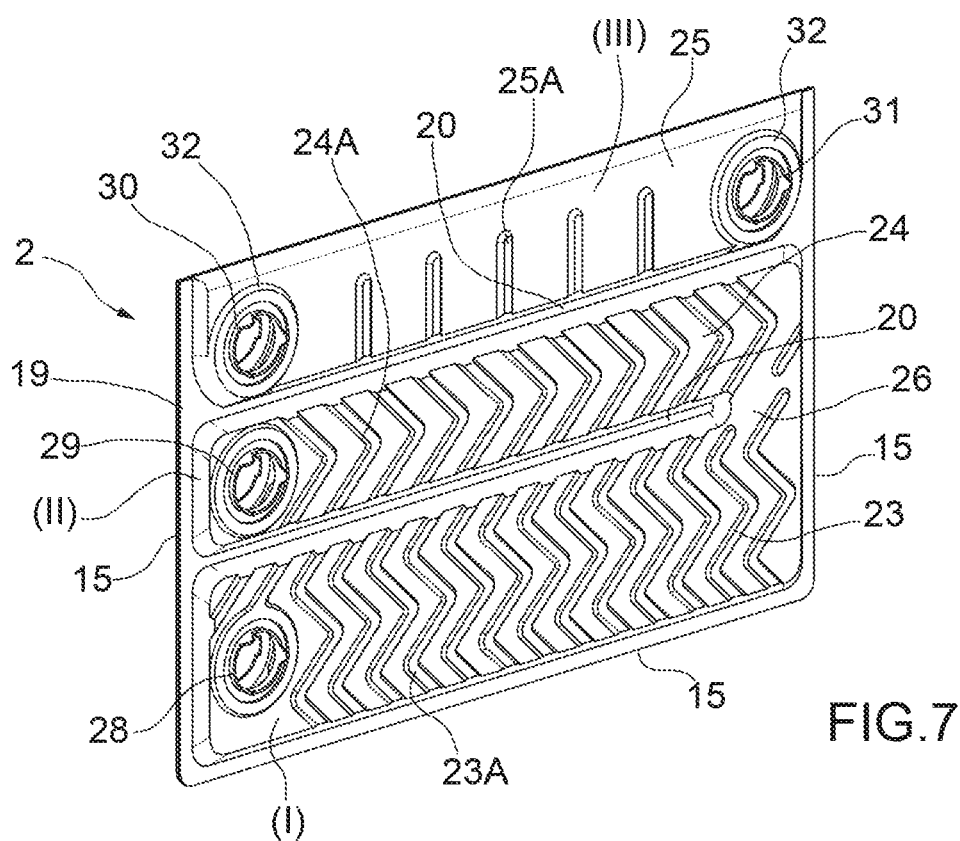
FIG. 7 shows a first face of a first embodiment, of the plate heat exchanger shown in FIGS. 1, 2, 3.

Alternatively, plates 2 are assembled and kept in their position by autogenous welding or brazing on circular rings 32 surrounding the through holes 14 for the passage of water (FIG. 7).

Thanks to the previously described drawing operation, in each exchange element three horizontal and mutually parallel channels 23, 24, 25 are formed, in which the water flows in a horizontal direction, perpendicular to the vertical direction of the fumes (downwards) (FIGS. 2, 3). In a first embodiment of the plate 2 shown in FIG. 7, the lower channel 23 and the intermediate channel 24 are hydraulically connected, on the right side of the plate 2, by means of a passage 26.

The water can thus rise from a first lower level (I), where lower channels 23 are arranged, to a second intermediate level (II) (FIG. 7), where intermediate channels 24 are arranged.

However, in the first embodiment of FIG. 7, the intermediate channel 24 arranged at the second level (II) and the upper channel 25 arranged at a third level (III) are not in hydraulic communication.

Figure 9:
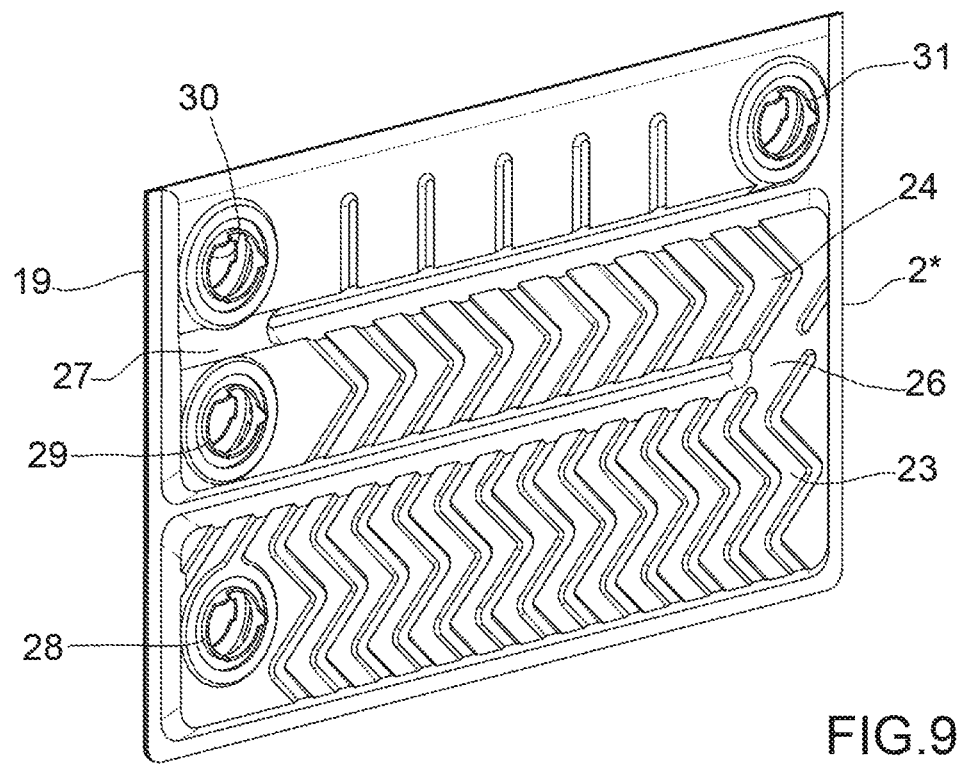
FIG. 9 shows a first face of a second embodiment of the plate heat exchanger shown in FIGS. 1, 2, 3.
Figure 10:
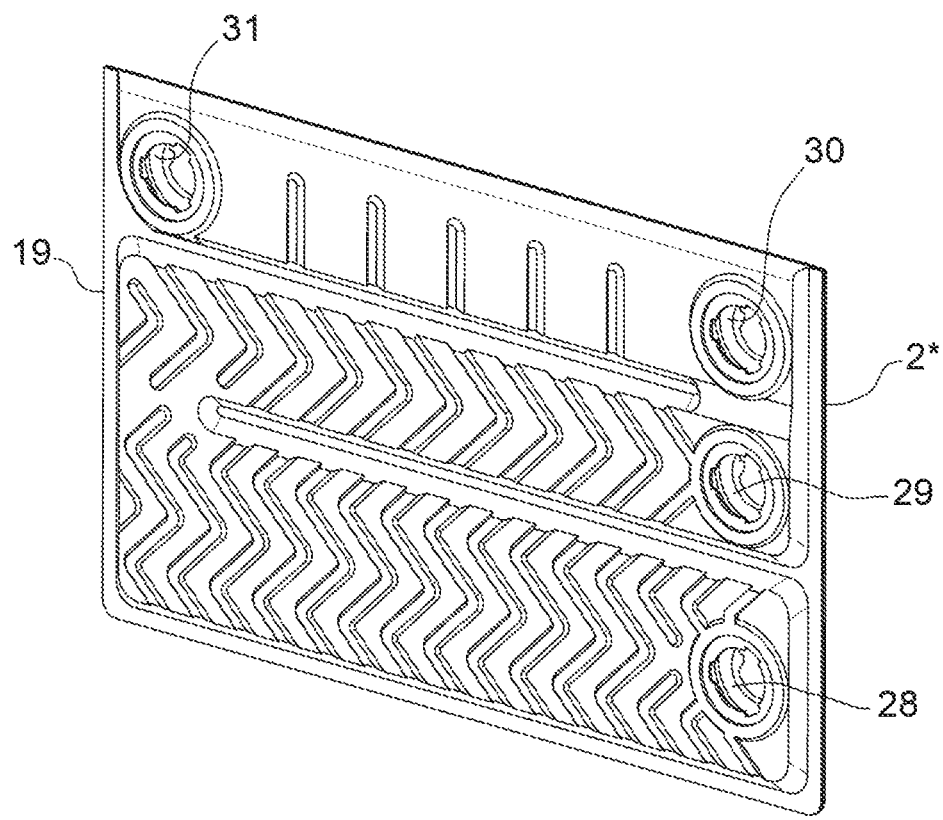
FIG. 10 shows a second face of the plate of FIG. 9.

In a second embodiment of the plate 2* which has been shown in FIGS. 9, 10, the intermediate channel 24 and the upper channel 25 are, on the other hand, in hydraulic communication through a passage 27 that allows the rise of heated water from the second (II) to the third (III) level (FIG. 9). The passage 27 is arranged on the left side of the plate 2*.

The lower part of each plate 2, in correspondence to channels 23 of the lower layer, comprises a first opening 28 formed by overlapping two holes 14 which, as previously stated, have been made on sheet. 2A (FIG. 4). Obviously, the two holes 14 for obtaining the first opening 28 are superimposed by bending metal sheet 2A, as seen with a reference to FIGS. 4 and 5.

As shown in FIG. 3, the first openings 28, the plurality of plates 2, 2* and the fitting 6 form together a first horizontal duct 230 having an axis (X1) substantially perpendicular to the plurality of lower channels 23.

In actual use, (see arrow (F1); FIG. 3) the cold water coming from the heating system enters through the fitting 6, then flows through the first horizontal duct 230 and is gradually horizontally and transversely distributed in the lower channels 23 of the packed plates 2, 2*.

As previously stated, the water cannot leave the plates 2, 2* through the first openings 28 to flow in the gaps 40 (where, on the contrary, the combustion gas must flow) due to the presence, between a plate 2, 2* and the other and in correspondence to the first openings 28, of the aforementioned toroidal gaskets 21.

The same applies to the intermediate channels 24, arranged at the second level (II).

In this case a plurality of second openings 29 of the plurality of plates 2, 2* form a second horizontal duct 240 having an axis (X2) substantially perpendicular to the plurality of intermediate channels 24 (FIG. 3).

Figure 8:
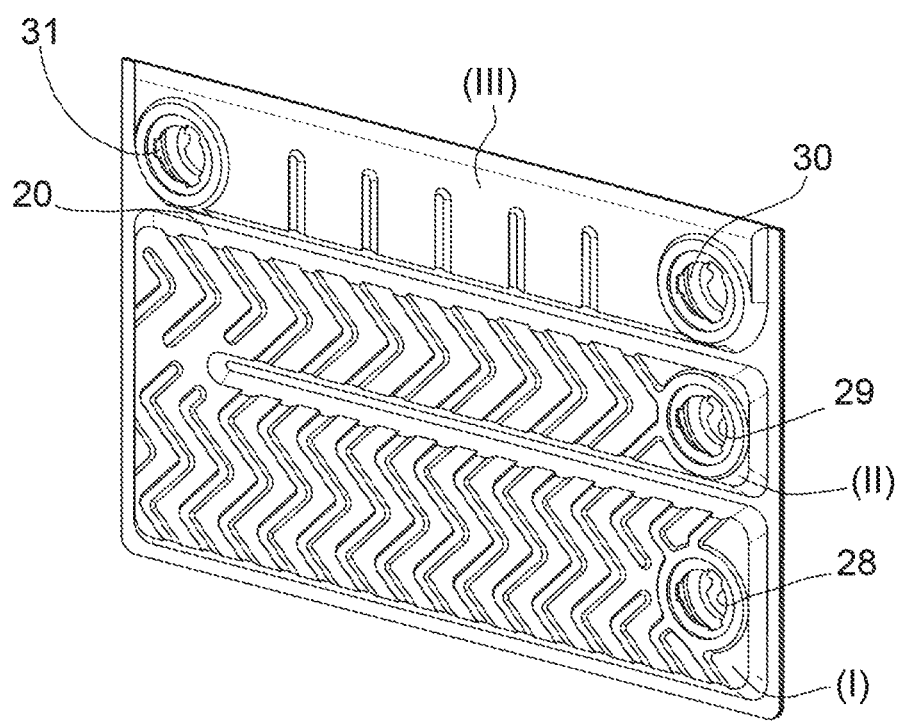
FIG. 8 shows a second face of the plate of FIG. 7.

As shown in FIGS. 7 and 8, in the upper left and right part of each plate 2, 2* in correspondence to the upper channels 25 of the third level (III), a third opening 30 and a fourth opening 31 are formed to provide a water circulation in series or in parallel in the set of plates 2, 2* forming the heat exchanger 1 according to what described below.

While the first level (I) and the second level (II) are provided only with a respective opening 28, 28, the third level (III) is provided with two openings 30, 31, precisely because only the third level (III) will possibly have to be provided with connections in series between the various plates 2, 2*.

General speaking, the number of openings 28, 29, 30, 31 must be equal to that of the levels (I), (II), (III) plus one. In the present case, therefore, there are four openings for three levels.

Third openings 30 and fitting 7 (all aligned along an axis (X3)) form together a third horizontal duct 250 arranged at the third level (III); such third horizontal duct 250 being perpendicular to all the upper channels 25.

The fourth openings 31, which are also aligned along an axis (X4), are used to achieve the hydraulic connections in series between the plates 2, 2* at the third level (III).

Figure 11:
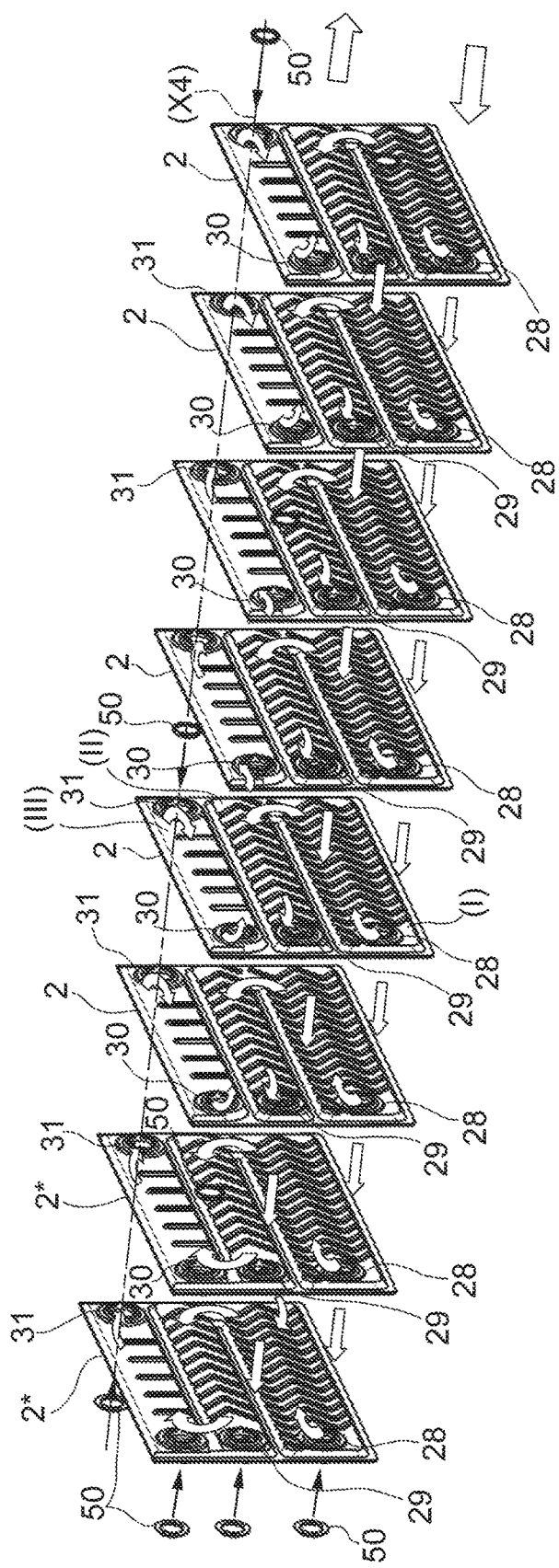
FIG. 11 shows an exploded view of a first embodiment of a heat exchanger according to the present invention.

The four axes (X1), (X2), (X3) (X4) are parallel to each other (FIG. 11).

Also with regard to openings 29, 30, 31 sealing gaskets 21 having a toroidal shape are used to prevent the leakage of water to the gaps 40.

As it is evident from FIG. 11, which shows an exploded view of the plates 2, 2*, the set of plates with relative openings 28, 29, 30 form some collectors.

In particular, openings 28 arranged in the lower left part of plates 2 form the aforementioned first horizontal duct 230 which acts as a collector of the system return water (arrow (F1)).

From the first horizontal duct 230, the water is evenly distributed across each plate 2, 2*.

A pipe (not shown in the figures) provided with calibrated holes in correspondence to the single elements can be used to obtain an even distribution of the water inside the plates 2, 2*.

Once entered into every single plate 2, 2*, water proceeds horizontally in the channels 23 of the first level (I) up to the other end and then rises into channels 24 of the second level (II), thus flowing in passages 26.

At the second level (II), then, the water proceeds horizontally following a direction opposite to the one of the first level (I) until it reaches the second horizontal duct 240 and flows transversely to plates 2, 2*.

As shown in FIG. 8, in all the first six plates 2 there is a physical separation between the ducts of the second level (II) and those of the third level (III). The physical separation between the levels (II) and (III) is given by two overlapping side inner strips 20.

However, in the last two back plates 2* the second level (II) communicates with the third level (III) through passages 27.

Therefore, the water coming from the second level (II) of each plate 2, 2* is collected in the collector and led to the third level (III) using the passages 27 of the last two plates 2*.

The third level (III) is the one directly exposed to the flame of the burner 4.

At the third level (III) the channels 25 formed in the plates 2, 2* nave perforated walls at their ends, which are open or closed in order to guarantee that the water flows through the horizontal channel 25 of the third level (III) of each plate 2 in series or in parallel with the channel 25 of the adjacent plate 2 according to needs which will be later described.

Figure 12:
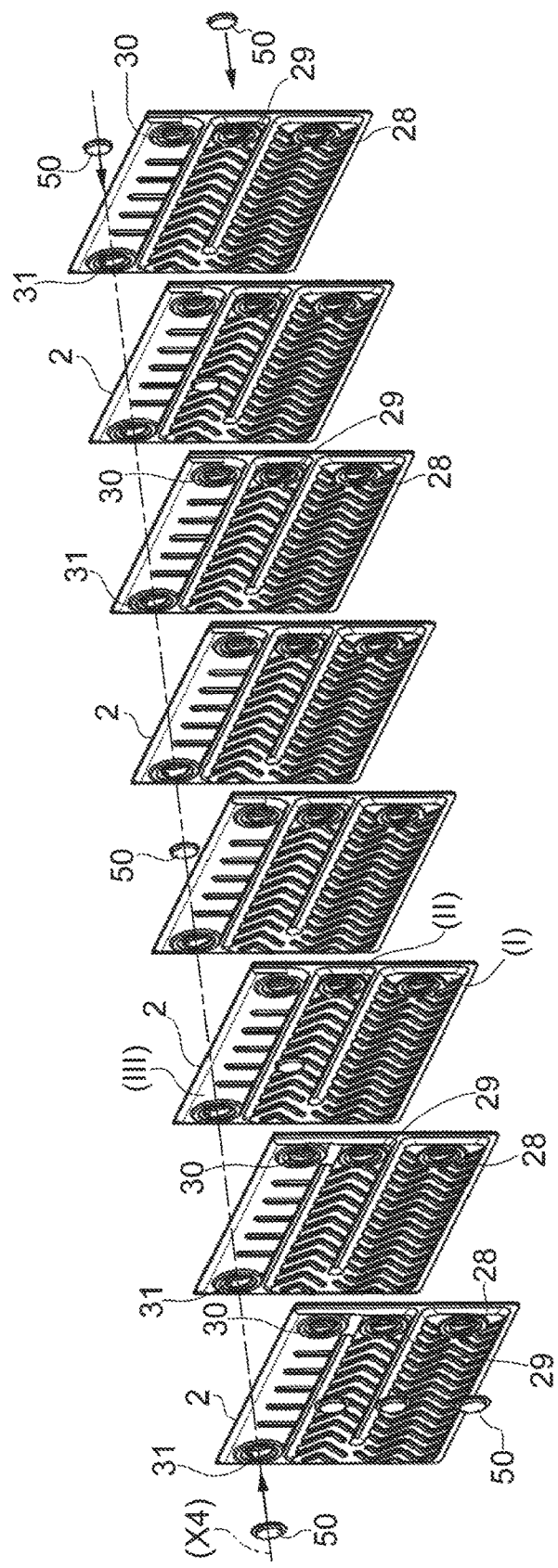
FIG. 12 shows the same exploded view of FIG. 11 seen from another point of view.
Figure 13:
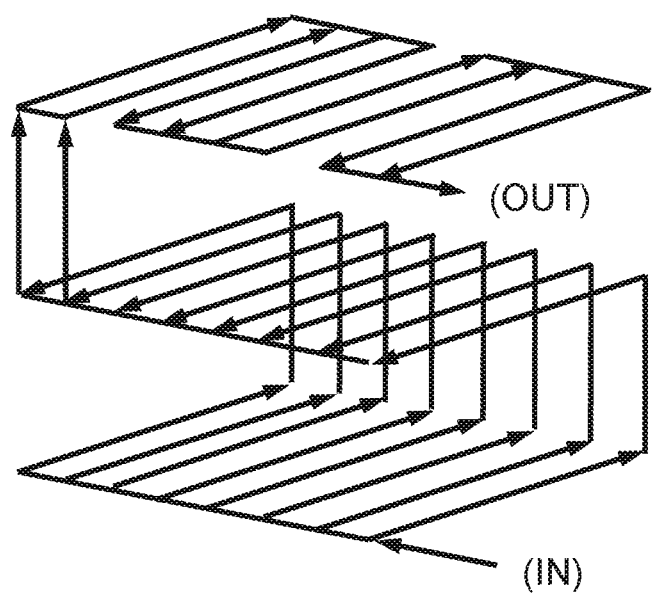
FIG. 13 shows a water flow diagram in the heat exchanger of FIGS. 11 and 12.

In the embodiment illustrated in FIGS. 11 and 12, water flows along channels 25 of the third level (III) two by two in parallel, each pair maintaining a circulation in series with respect to the other channels 25 of the same level (III) (FIG. 13).

In channels 23, 24, 25 outward facing imprints 23A, 24A, 25A have been obtained, by means of drawing, whose shape and depth are such that:
  they come in contact with the imprints on the adjacent plates in order to mutually counteract the pressure of the water inside them;
  they promote the heat exchange between the passing fumes and the water to be heated, more with the channels 23 and 24, and less with the channels 25.

In particular, both the flaps 23A and the flaps 24A are significantly less in number than flaps 25A and have a more complex shape because, while in the areas closer to the flame of burner 4 (third level (III); FIGS. 2, 3) the water must not boil, the heat exchange must be promoted as much as possible in the other two layers (I) and (II), where the arriving fumes are much colder.

Moreover, channels 25 of the third level (III) have a smaller drawing depth than channels 23 of the first level (I) and channels 24 of the second level (II), thus increasing the cross section of the fumes passage between adjacent plates and, at the same time, increasing the water speed inside channels 25, always in order to avoid the risk of boiling water.

In other words, in the first case channels 25 of the third level (III) of each pair of plates 2,2* are in series with respect to the preceding or following pairs of plates 2; 2* (FIG. 13).

Once reached the front plate, the water leaves heat exchanger 1 through opening 30 formed in the front wall of front plate 2 to be sent to the system delivery duct through fitting 7.

According to the number of plates 2, 2* connected in parallel in the channels 25 of the third level (III), opening 30 connecting the heat exchanger 1 to the system delivery duct can be arranged at the left end (as in the example of the figure), or at right end of said front plate 2.

This circuitry allows water:
- to flow through the plates 2, 2* in parallel, and therefore at low speed and with a low load loss, in channels 23, 24 of the first level (I) and of the second level (II); i.e. where the temperatures of the fumes lapping the outside of plates 2 are low and there is no risk of boiling the water circulating in them;
- to flow through plates 2, 2*, partially in parallel or even only in series, and therefore at high speed, in channels 25 of the third level (III); i.e. where the temperature of the fumes is very high and the risk of boiling water is high, while obtaining at the same time total load losses which are not too high for the whole heat exchanger 1.

In the example illustrated, in FIGS. 11, 12, 13, the described result is achieved by using a total of six plates of types 2 and two plates of type 2* (FIGS. 7, 8 and, respectively, FIGS. 9, 10).

Then a plurality of diaphragms 50 for closing, for example by welding (as in the example of FIGS. 11, 12), or by interposing additional toroidal gaskets, the openings 28, 29, 30, 30 formed on the plates 2, 2* for creating the hydraulic circuits must be available.

As it is evident, from what has been previously discussed, the use of different combinations of plates 2, 2* and diaphragms 50 allows:
- to vary the number of plates 2* allowing the passage from, second (II) to third (III) level of ducts 24, 25 of neat exchanger 1; and
- to vary the number of paths in series and in parallel of third level (III);

thereby obtaining a load loss compatible with the system requirements and a speed of the water in channels 25 of the third level (III) compatible with the need, to avoid the boiling of the water.

The example Illustrated in FIGS. 1, 2 and 3 refers to a 24.5 kW neat exchanger 1 formed by eight elements with seven gaps crossed by the fumes (fumes channels).

In the example illustrated in FIGS. 11, 12, water flows inside the elements of the exchanger, and in particular in the channels of third level (III), with a sequence of pairs of channels in parallel according to the water flow diagram shown in FIG. 13.

The loss of thermal load in the whole heat exchanger and of water speed in the single channels of the third level obtained in this embodiment are optimal for the application in gas boilers with this power.

Figure 14:
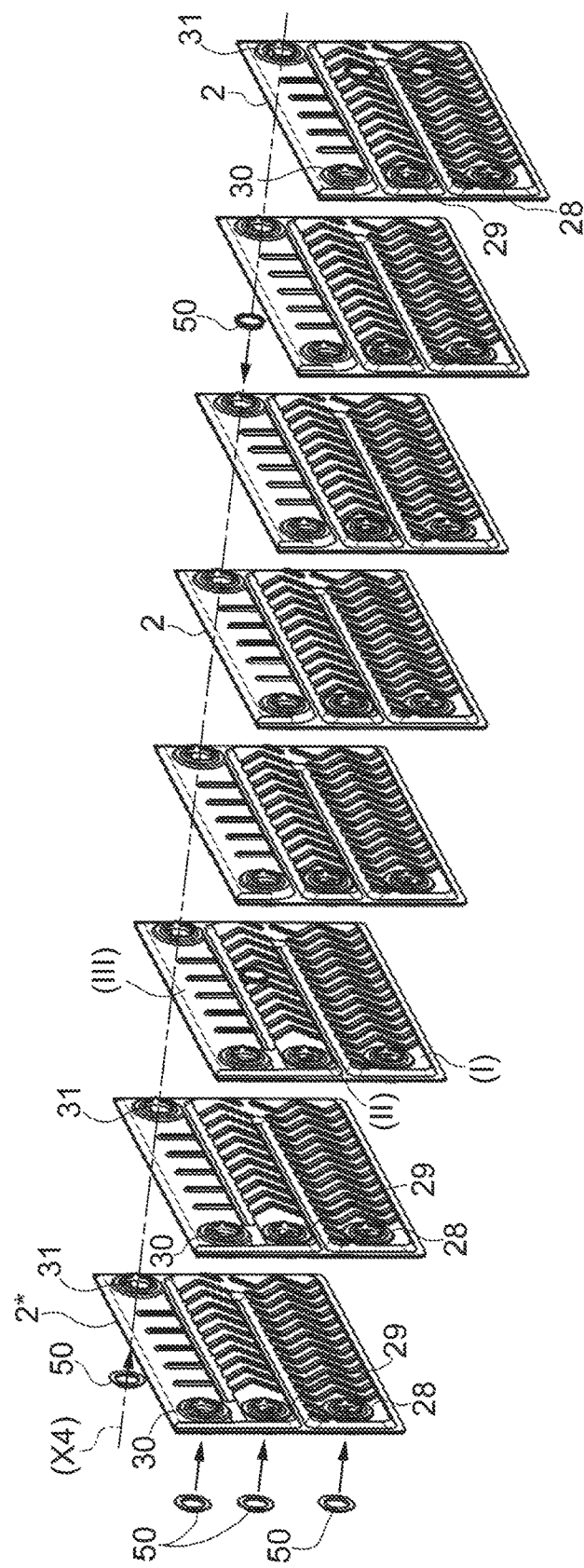
FIG. 14 shows an exploded view of a second embodiment of a heat exchanger according to the present invention.
Figure 15:
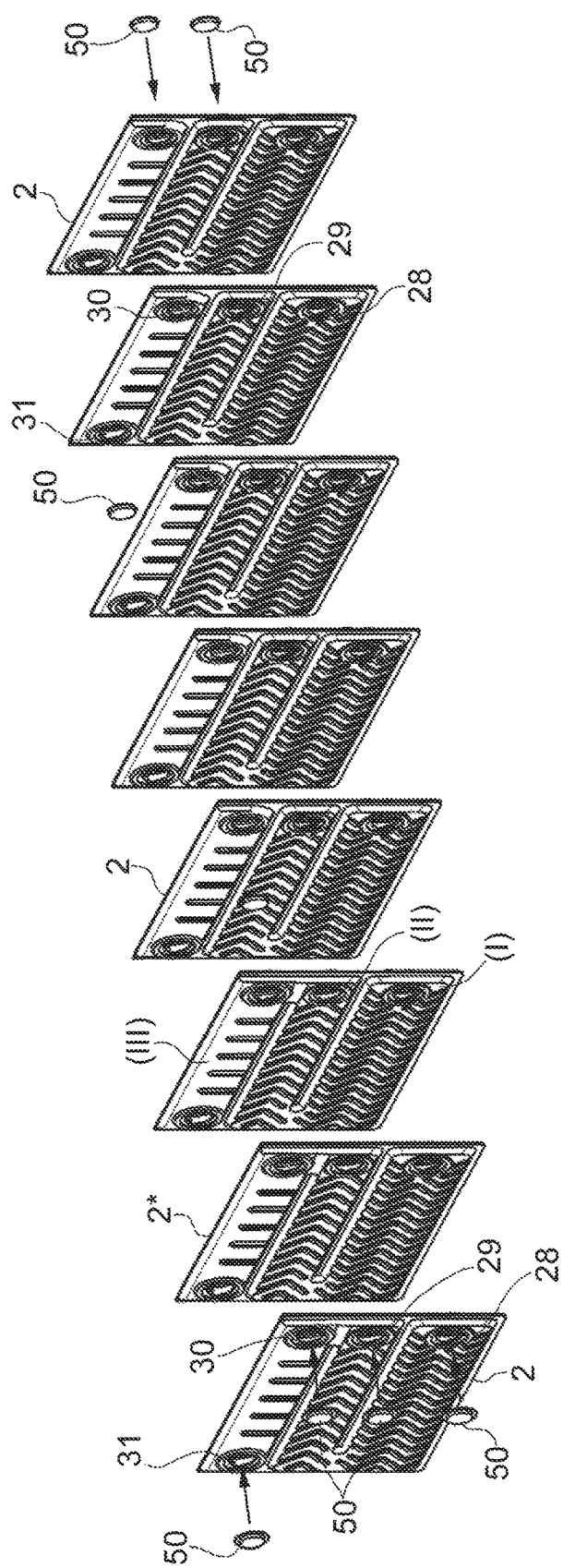
FIG. 15 shows the same exploded view of FIG. 14 seen from another point of view.
Figure 16:
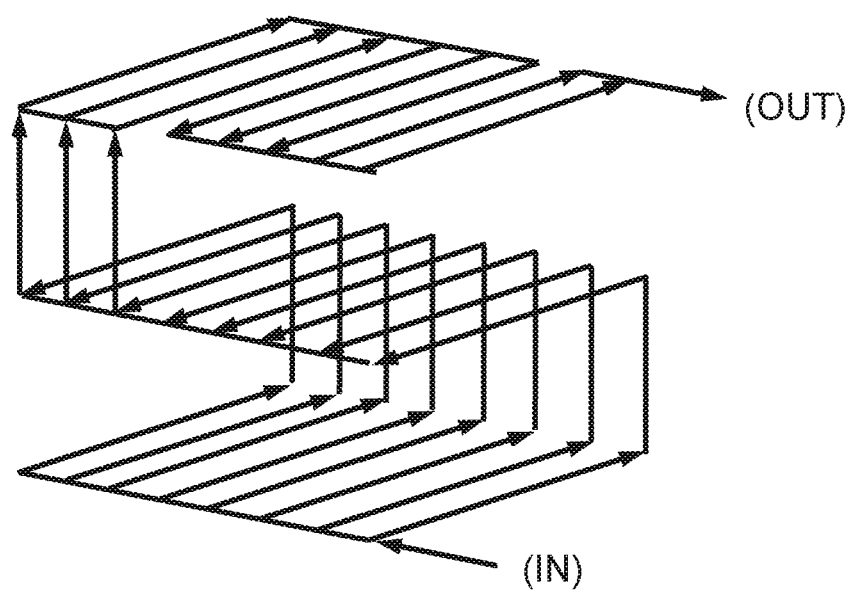
FIG. 16 shows a diagram of water flow in the heat exchanger of FIGS. 14 and 15.

FIGS. 14, 15, 16 show a second heat exchanger, once again formed by eight plates, but having in the third level (III) a sequence of three channels in parallel followed by further three channels in parallel followed by further two channels in parallel.

With the same flow rate, this neat exchanger has a load loss which is 20% lower than the preceding one, and a water speed inside the three parallel channels of the third level lower than 30%.

Figure 17:
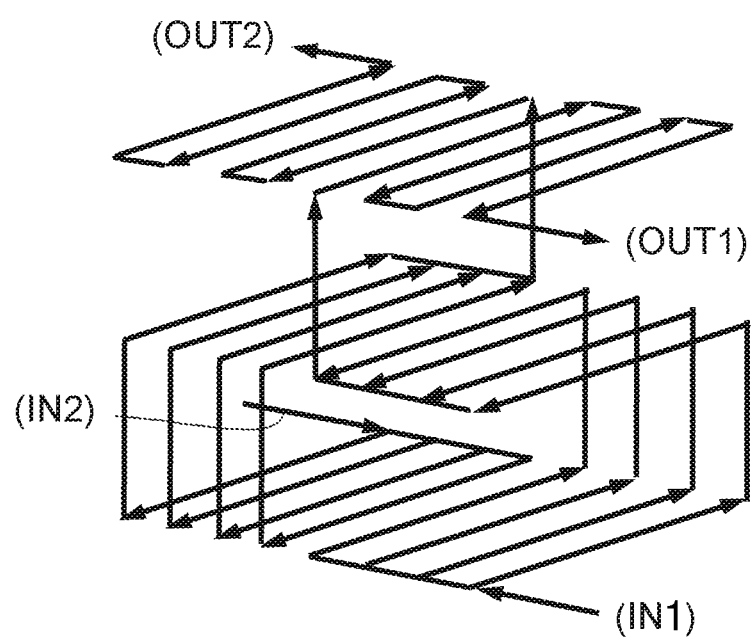
FIG. 17 shows a diagram of water flow in a heat exchanger (not shown) which is also made according to the teaching of the present invention.

The flow diagram in FIG. 17 shows a further possible combination of the same number of plates intended to exchange the same power with a much smaller loss of load.

While in the flow diagrams of FIGS. 13 and 16 there is only one water inlet (IN) and one water outlet (OUT), the flow diagram of FIG. 17 shows a case with two water inlets (IN1), (IN2) and two water outlets (OUT1), (OUT2).

In this case the eight plates have been divided into two groups, each consisting of four adjacent plates having the ducts of the third level (III) connected in series.

Each group has its own connection to the system return flow and to the system supply flow, whereas the burner remains only one for the whole heat exchanger.

With the same flow rate, this heat exchanger has a load loss lower than 50% if compared to the starting embodiment, while maintaining the water speed in the third layer (III) at the same value.

Having the same total number of plates, but varying the number of plates of type 2* having ducts of the second (II) and of the third level (III) in communication, and varying the number of plates with a circulation in series and in parallel in the third level (III), it is therefore possible to realize exchangers that, with an equal power, are more suitable for boilers working with high flow rates, and that therefore require a smaller load loss in the heat exchanger; or which are more suitable for boilers working with low flow rates, and that therefore require to withstand high power levels without collapsing because of boiling water in the plates.

In other applications, not shown, some of the holes of the plates can be closed from the beginning; i.e. the sheet metals used, to build some of the plates are not cut in the areas where instead the through holes, subsequently closed by the diaphragms, should be found. In this way, on the one hand a certain saving is obtained, because there are no holes to be closed, but, on the other hand, there is a higher number of types of plates, thus involving higher costs of management of the warehouse.

Therefore, the manufacturer has to choose the best, solution to have the lowest possible number of types of plates, though avoiding, as far as possible, to open some through holes on the plates which must then be closed again by diaphragms.

The main advantages of the aforesaid plate heat exchanger are:
- to allow the circulation of water in series, or partially in series, therefore at high speed, in the parts of the plates exposed to the flame, using only two types of plates and a plurality of diaphragms;
- to a void unnecessary waste of material by using rectangular plates having burner and exhaust fumes ducts outside them;
- to use the smallest, possible heat-exchanging surface thanks to the high efficiency of the heat exchange in counter-current; and
- to avoid the welding of portions of the plates exposed to the flames, in order to avoid to risk their integrity.

The invention claimed is:

1. A heat exchanger for boilers comprising a set of heat exchange plates, wherein inside each plate circulates water to be heated while combustion products coming from a heating device pass outside in a gap between adjacent walls of two plates in a vertical direction; each plate is provided with openings;

said heat exchanger comprising:

a plurality of closing elements coupled to the set of plates to close a portion of said openings;

wherein each of said plates comprises at least three levels of respective channels housing the water to be heated, wherein the channels are arranged in a horizontal direction, perpendicular to the vertical direction of combustion products; wherein an upper level of the at least three levels is closest to the heating device and a lower level of the at least three levels is farthest from the heating device;

said set of plates and said plurality of closing elements being combined such that the water flows through the set of plates in parallel in channels on the lower level, and such that the water flows through the set of plates at least partially in series in channels on the upper level.

2. The heat exchanger, according to claim 1, comprising at least one of the plurality of heat exchange plates having a passage for hydraulic connection between two of the at least three levels of respective channels.

3. The heat exchanger, according to claim 2, wherein the set of heat exchange plates comprises:

a first set of plates; each of the first set of plates being provided with openings arranged at the at least levels communicating with a first side by means of a first passage in communication with the lower level of channels;

a second set of plates; each of the second set of plates being provided with openings arranged at different levels communicating with a second side by means of a second passage; said second side being opposite to said first side; and the plurality of closing elements; numbers and positions of said closing elements being selected according to the flow path to be followed by the water inside the heat exchanger.

4. The heat exchanger, according to claim 3, wherein the lower level comprises more imprints than the upper level.

5. The heat exchanger, according to claim 3, wherein the channels of the upper level have a drawing depth smaller than a drawing depth of the channels of the lower level, thus increasing a speed of the water inside the channels of the upper level.

6. The heat exchanger, according to claim 1, wherein a number of openings is equal to a number of levels plus one.

7. The heat exchanger, according to claim 1, wherein the openings of the plates comprise first openings, second openings, third openings, and fourth openings, wherein the first openings are aligned along a first axis, the second openings of the plates are aligned along a second axis, the third openings of the plates are aligned along a third axis, and the fourth openings of the plates are aligned along a fourth axis; said axes being parallel to each other.

8. The heat exchanger, according to claim 7, wherein the first openings and a fitting for connection to a water supply system form a first horizontal duct along the first axis that is substantially perpendicular to the first level of channels; the second openings form a second horizontal duct along the second axis that is substantially perpendicular to the second level of channels; and the third openings form a third horizontal duct along the third axis that is substantially perpendicular to the third level of channels.

9. The heat exchanger, according to claim 1, wherein each plate is manufactured starting from a sheet metal which is formed by deep drawing two areas that are lowered relative to a horizontal reference plane on which an outer edge lies.

10. The heat exchanger, according to claim 9, wherein the sheet metal is sheared in order to obtain the openings.

11. The heat exchanger, according to claim 9, wherein the sheet metal, which has been formed and sheared, is folded along a middle line and three edges that are still free are welded to obtain a plate.

12. The heat exchanger, according to claim 10, wherein the sheet metal is sheared to obtain openings, with the exception of those where the plurality of closing elements would otherwise be arranged.

* * * * *